United States Patent [19]

van den Bosch

[11] 3,922,092
[45] Nov. 25, 1975

[54] MONOCHROMATOR AND LIGHT DISPERSING APPARATUS

[76] Inventor: Francois J. G. van den Bosch, 11 Hillcrest Road, Cedar Grove, N.J. 07009

[22] Filed: Dec. 6, 1973

[21] Appl. No.: 422,421

[52] U.S. Cl. .............................. 356/100; 356/188
[51] Int. Cl. ............................................. G01j 3/12
[58] Field of Search ............ 356/99, 100, 101, 188

[56] References Cited
UNITED STATES PATENTS

| | | | |
|---|---|---|---|
| 2,631,489 | 3/1953 | Golay | 356/99 |
| 3,700,331 | 10/1972 | White | 356/99 |
| 3,728,540 | 4/1973 | Todd et al. | 356/51 |
| 3,794,425 | 2/1974 | Smith et al. | 356/188 |

*Primary Examiner*—Vincent P. McGraw
*Attorney, Agent, or Firm*—Watson, Cole, Grindle & Watson

[57] ABSTRACT

Narrow band light spectra suitable for spectrographic analysis are generated from a wide band light spectra source by successively scanning the respective light band spectra. In one embodiment, successive rotating scanning wheels having respective apertures therein are positioned such that the desired band width spectra within the entire spectrum of interest, or a portion thereof, are scanned whereby each scan causes the light band spectra output therefrom to be narrower than the light band spectra input thereto. The positioning of the apertures may be varied as desired. The scanning members are driven synchronously.

In a second embodiment, the scanning members comprise rotatable drums, each having a plurality of distinct and separate reflecting surfaces on the circumference thereof, and the successive reflections of the light spectra from one rotating drum to another produce a narrow band light spectra output from a dispersed light radiation source.

16 Claims, 13 Drawing Figures

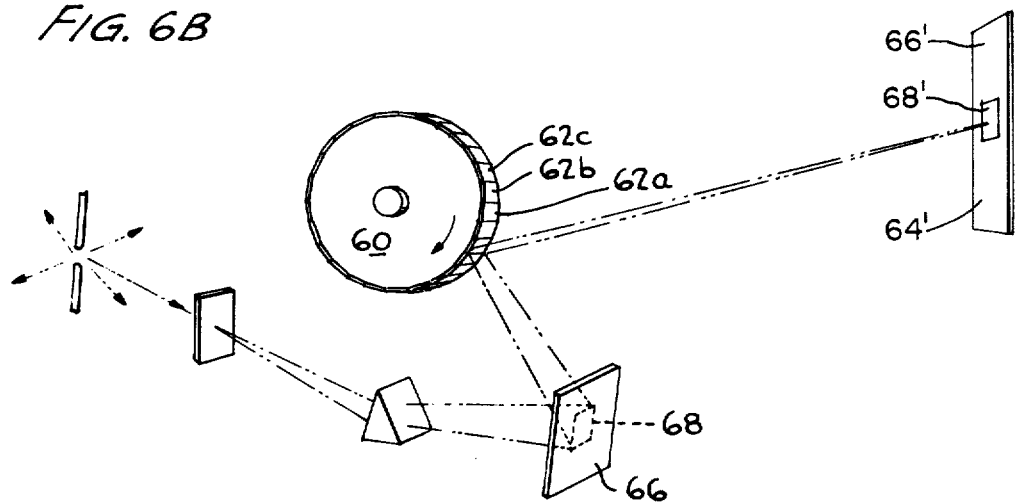
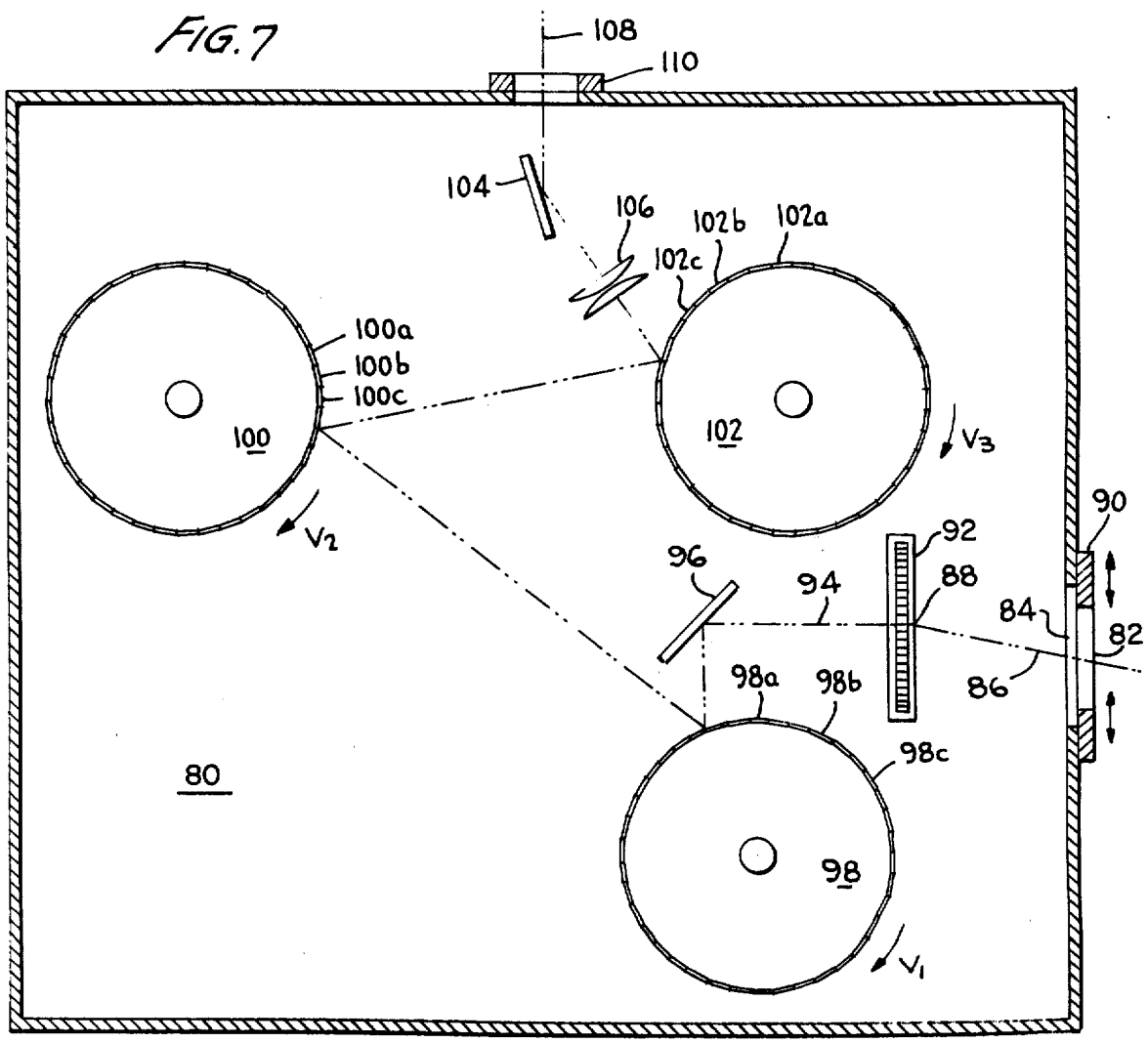

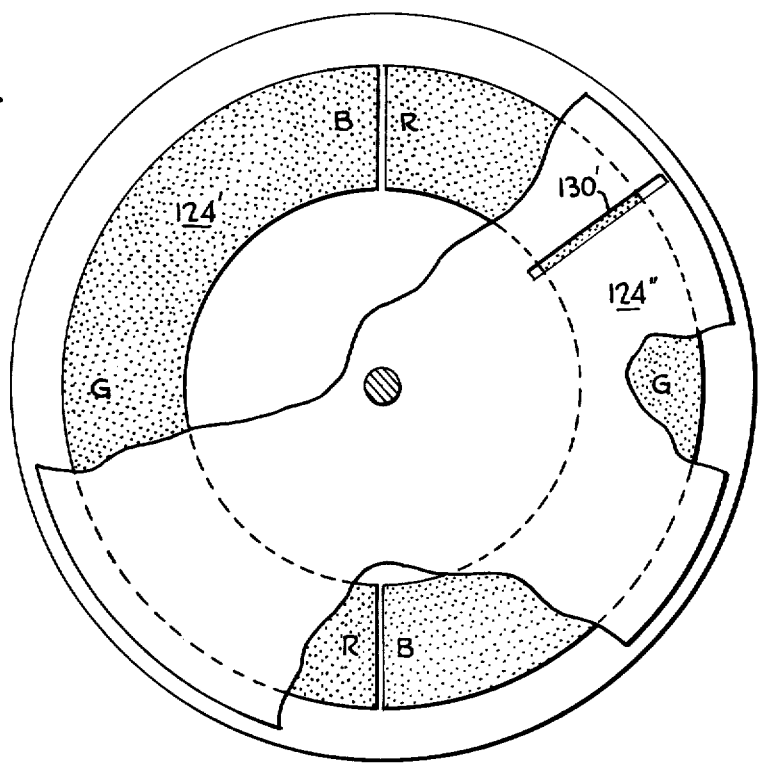
FIG. 8C
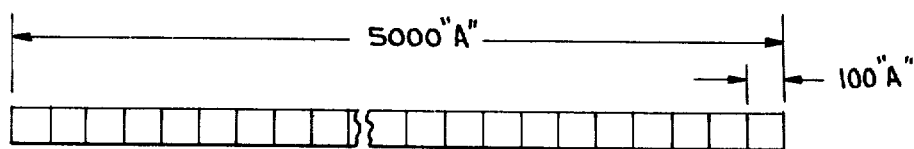
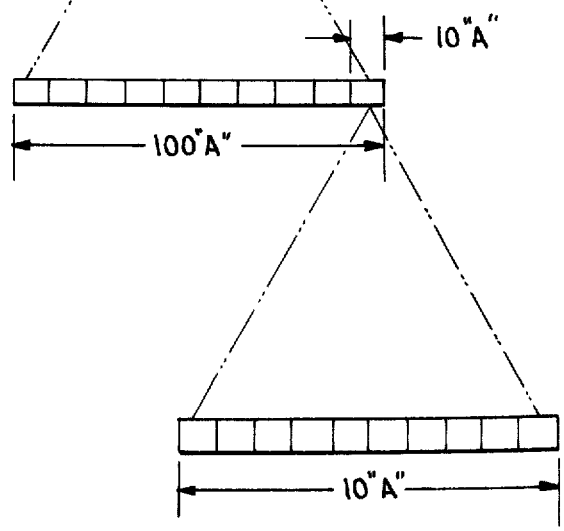
FIG. 5

MONOCHROMATOR AND LIGHT DISPERSING APPARATUS

This invention relates to optical devices and more particularly to improved monochromators used in spectrographic apparatus for the analysis of light. Spectrographic apparatus measures relative amounts of radiant energy or radiant flux as a function of its wavelengths. Such apparatus has been increasingly used as both a qualitative and quantitative analytical tool for the determination of the elements or compositions of substances, the impurities in solutions, etc. Spectrographic instruments have been improved so that they are capable of measuring to an accuracy of 0.001 percent. Consequently, spectrographic instruments are of great importance in analytical laboratories.

Spectrographic apparatus may be considered as refined filters or photoelectric photometers using continuously variable and monochromatic bands of energy. A monochromator is a device for isolating monochromatic (i.e. homogeneous) or, more generally, narrow bands of radiant energy within the spectrum of light or radiant flux emitted by a given radiant energy source. The improved monochromators of this invention, while having broad application to the general field of spectrographic instruments, are particularly useful for the visual display and observation of biological specimens and in particular to such display and observation using simplified color T.V. techniques in T.V. microscope type apparatus. Such apparatus forms the subject matter of U.S. patent application, Ser. No. 379,099, filed on July 13, 1973, entitled "High Resolution Color T.V. Microscope Apparatus" by the same inventor as this application. The disclosure of the aforesaid U.S. patent application is intended to be incorporated herein by reference. The aforementioned application discusses the importance of the bandwidth of the irradiating source in obtaining optimum resolution of the object or specimen under examination.

Optical resolution is defined from the following known relationship.

$$l = 0.61 \, \lambda / n \, \sin u$$

where $l$ is defined as the smallest distance between two points of the object that are just resolved, $\lambda$ is defined as the bandwidth of the irradiating source, $n$ is defined as the refractive index of the material in the object space, $u$ is defined as the angle that the extreme ray entering the objective makes with the axis of the instrument.

Consequently, because of the importance of the bandwidth of the irradiating light on a specimen in obtaining higher and increased resolution of the resulting specimen image, there is a need for improved monochromators, the function of which, as indicated above, is to provide narrow bands of radiant energy for spectrographic observation and analysis of a specimen or object.

OBJECTS OF THE INVENTION.

It is a primary object of this invention to provide improved monochromator apparatus for generating narrow bands of radiant energy over a desired light spectrum.

It is a further object of this invention to provide monochromator apparatus capable of isolating monochromatic bands of energy from a wide band radiant energy source.

A still further object of this invention is to provide improved apparatus of the type specified herein which is inexpensive and easily manufactured.

Another object of this invention is to provide improved monochromator apparatus for use in color T.V. type microscope apparatus for the visual display and observation of microbiological specimens.

SUMMARY OF THE INVENTION.

Monochromators may be generally considered under two main classifications or categories, namely those employing gratings and those employing prisms as dispersing elements. Generally, a monochromator has an entrance slit into which wide-band light energy is directed. The energy is then dispersed into a spectrum by a suitable dispersing device. The dispersed spectrum is then focused at an exit slit or port, thereby enabling a narrow portion of the energy to be selected and projected onto a specimen or object being investigated. Thereafter the reflected or transmitted energy is sensed by a receiving or measuring device. Such a device using simplified color T.V. techniques is disclosed in the aforementioned co-pending U.S. patent application.

Gratings, especially replica gratings, are generally less expensive than prisms and are therefore used in less expensive and less accurate instruments for dispersing the radiant energy. Although echelette gratings may be constructed so that eighty percent of the incident energy from the energy source is diffracted in a given spectrum on one side of the normal, such gratings produce several orders of spectra. Such stray spectral energy is undesirable as it may cause serious errors in spectrographic measurements. Homogeneity or purity of the energy used has, of course, a significant and profound effect on the accuracy of spectrographic measurements as indicated by the above formula. For example, narrow absorption bands may be completely undetectable or may appear only as inflections in the spectrographic curve if too wide-band energy is used.

The embodiments of the present invention eliminate or reduce such undesirable characteristics to obtain accurate and reliably repeatable measurements. In one embodiment of this invention, radiant light energy is dispersed by a prism onto a first rotating scanning wheel having therein especially shaped and positioned scanning apertures. The apertures are positioned so that the desired bandwidth spectra within the entire spectrum, or a portion, of the dispersed light is scanned. The bandwidth spectra passing through the respective scanning apertures are projected by a lens system onto a second scanning wheel, which is rotated in synchronism with the first scanning wheel, but at a greater speed, and having therein apertures corresponding in number and position to the apertures of the first scanning wheel. The further narrowed bandwidth spectra emanating from each of the scanning apertures of the second scanning wheel are then projected by a suitable lens system to the exit port of the monochromator.

In a second and preferred embodiment, the radiant energy projected into the entry slit of a monochromator is passed through a special transmission grating which is rotated and consists primarily of two optically flat pieces of glass between which are interposed a mixture of pigments having a refractive index which covers the entire spectrum of interest. The spectra emanating from the transmission grating are then projected onto a first rotating mirror drum. The periphery of the first drum includes angled and equally spaced reflecting surfaces for scanning the entire dispersed light spectra, or a portion thereof. Reflected light spectra are then projected onto a second mirror drum, similar to the first mirror drum. The reflected narrowed bandwidth spectra may then be projected onto a third mirror drum, similar to the aforementioned first and second mirror drums. Each reflection of the light spectra from each of the respective mirror drums produces a reduction in the bandwidth of the light spectra. Finally, the narrowband light spectra from the third mirror drum is projected through a suitable lens system and focused upon the exit slit of the monochromator. Each of the three mirror drums is rotated in synchronism by a suitable drive mechanism but at successively greater speeds. Preferably, the number of reflecting surfaces on each of the mirror drums are equal; however, this invention contemplates the use of non-equal reflecting surfaces mounted on each of the respective mirror drums.

This invention further contemplates the illumination of a specimen or scene by one or two pure bands of monochromatic light. For example, the monochromator embodiments of this invention may be used to display the distribution of oxyhemoglobin in live tissue of a patient on an operating table. It is known that the wavelength bands of oxyhemoglobin are 5750 Angstroms and 5400 Angstroms. By using a fast moving disc, on which are alternately mounted interference filters having respective peaks of 5750 and 5400 Angstroms, interposed in the light path between a light source and the patient on the operating table, the color T.V. camera disclosed in the aforesaid co-pending U.S. patent application receives the video signal of these two wavelengths and those signals are then displayed as a color picture on a color T.V. monitor. This enables the display of the exact distribution of oxyhemoglobin for immediate viewing by the attending physicians and technicians (or observers, as the case may be) in the operating area while the operation is being performed. Such a procedure can also be used for other biological substances with similar results. The resultant video signal can also be electronically integrated and displayed instantaneously for visual observation of the total value of the oxyhemoglobin. Such information may be displayed by a differential counter, a dual oscilloscope, or a color T.V. monitor so that the normal oxyhemoglobin values may be simultaneously displayed therewith.

In a third embodiment of a monochromator, a continuous interference filter is deposited on a glass substrate in a circular pattern and at least two variable width slits are synchronously moved at different speeds in spaced relation to the interference filter to generate narrow band spectra. The interference filter is illuminated by an appropriate light source. The interference filter includes a gap for generating a sync or blanking pulse which is used to synchronize the color T.V. monitor on which the image of a specimen or object illuminated by the output band spectra of the monochromator is displayed as described in the aforementioned application.

In a modification of the aforesaid embodiment, two semi-circular interference filters are deposited upon a glass or other suitable transparent substrate to form a paired continuous interference filter. The transparent substrate is mounted in spaced relation to at least a pair of synchronously moving slits to generate narrow-band monochromatic spectra. In this modified embodiment the moving slits rotate at one-half the speed of the slits of the previously mentioned monochromator. One advantage of the modified monochromator is that flicker is reduced as the light spectra produced by the modified monochromator is truly continuous with no gap between any of the light spectra output. There is no synchronization pulse as with the parent embodiment.

BRIEF DESCRIPTION OF THE DRAWINGS.

FIG. 5 illustrates the principle of operation of the embodiments of the monochromator apparatus of this invention;

FIGS. 6A, 6B and 6C illustrate the operation of a scanning mirror drum;

FIG. 7 illustrates a second embodiment of a monochromator in accordance with the present invention;

FIG. 8C is a modified embodiment of a dispersing element used in the monochromator of FIG. 8B.

As is generally known when white light is passed through a prism it is scattered into light of different wavelengths from the red end of the spectrum to the violet end of the spectrum with the colors red, orange, yellow, green, blue and violet. In accordance with the principle of the present invention it is necessary to scan such a spectrum to select therefrom desired narrow bandwidths of light spectra from any one particular color or combination of colors within the spectrum. One way of viewing this is to consider the spectrum to be continuous light spectra of individual wavelengths. It is desired to select narrow bands within this light spectrum produced by the dispersal of white light through a dispersing device such as a prism.

Figure 1:
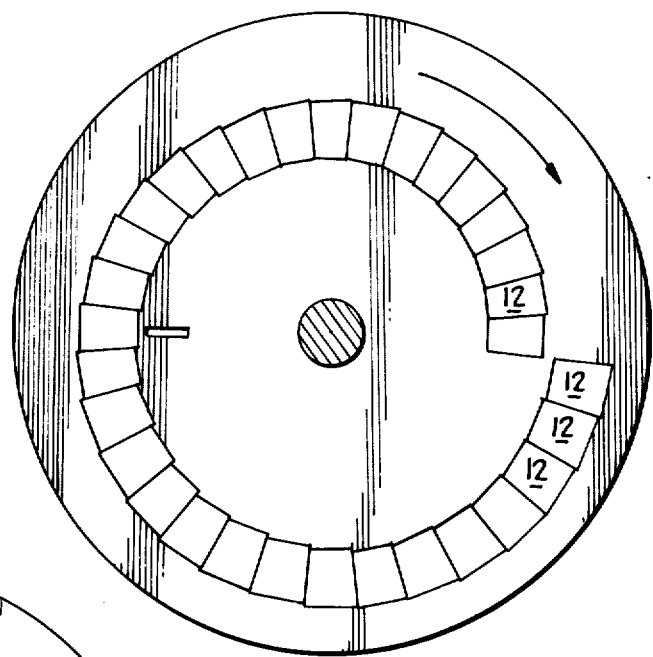
FIG. 1 illustrates a modified Nipkow disc in which the scanning apertures are in non-gap relationship and lie on a single-turn clockwise spiral trace for use in an embodiment of the invention.

A well-known scanning mechanism is the Nipkow disc, a variation of which is illustrated in FIG. 1. Scanning apertures 12 are formed on a single-turn-clockwise spiral trace as indicated in the Figure. Each of apertures 12 is rectangular and approximately 1 mm × 2 mm in size. Such a disc is used to scan the light spectrum by placing the disc in the path of the light spectrum and by revolving it, the light spectra will be divided into distinct bandwidths, equal to the number of apertures in the disc. Such an aperture arrangement produces no gaps between the band spectra. The apertures may be of any desired shape, such as circular, and either gapped or contiguous with respect to one another.

Figure 2:
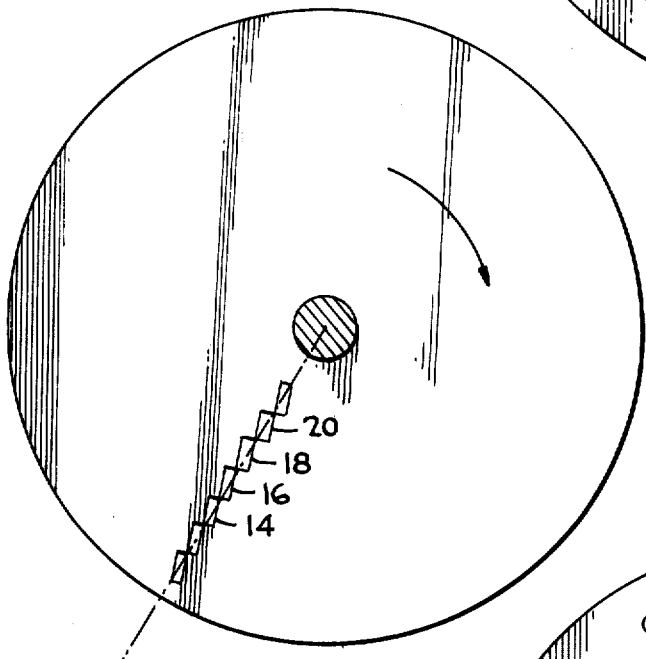
FIG. 2 illustrates a modified embodiment of a scanning disc in accordance with the present invention.

In the embodiment of FIG. 2, the apertures are represented by rectangular slits positioned to be contiguous with adajacent discs at a corner edge as illustrated in the Figure. Thus, if the light spectra is focused onto the plane of the disc so that the color spectrum extends from the red to the violet, for example, across the diameter of the disc, each of the apertures 14, 16, 18, 20, etc. will scan a particular portion of the light spectra such that the light spectra passing through each of the apertures will represent a particular bandwidth spectra of light. Further, the light spectra will be continuous as there are no gaps between adjacent edges of apertures 16 to 20.

Figure 3:
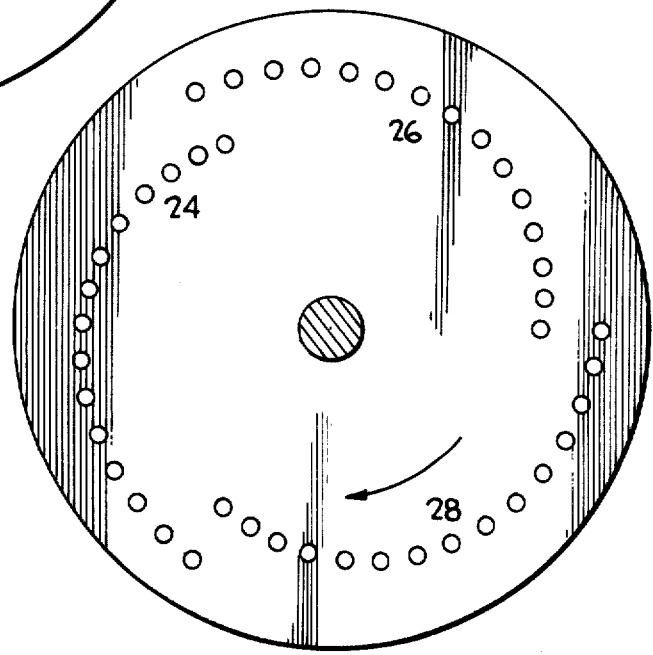
FIG. 3 illustrates a scanning disc used with the present invention.

FIG. 3 represents yet a further embodiment of a scanning disc which can be used with the apparatus of the present invention to obtain narrow bands of monochromatic light. In this embodiment, three sets of apertures 24, 26 and 28 are positioned on the disc as illustrated. In each aperture is mounted an interference filter of a selected bandwidth and 100 Angstrom diameter. Each set of apertures 24, 26, 28 has an identical set of interference filters and a bandwidth of, for example, 4300 Angstroms with a spacing between each aperture of, for example, 200 Angstroms (edge-to-edge). Each of the apertures within sets 24, 26, 28 is so spaced with respect to the apertures of an adjacent set so that the apertures of the adjacent set fall within the spacing between the apertures of the next succeeding set. The reason for the particular interspacing of the apertures is to nullify the "skirts" of the various independent interference filters. The circular apertures illustrated in FIG. 3 may be replaced by rectangular slits illustrated in FIG. 2; however with the aforementioned spacing between rectangular apertures. The use of such a scanning disc or wheel as illustrated in FIG. 3 enables a total light spectrum, or a portion thereof, to be divided into narrow bandwidths with each bandwidth of light having an equal luminous intensity.

Figure 4A:
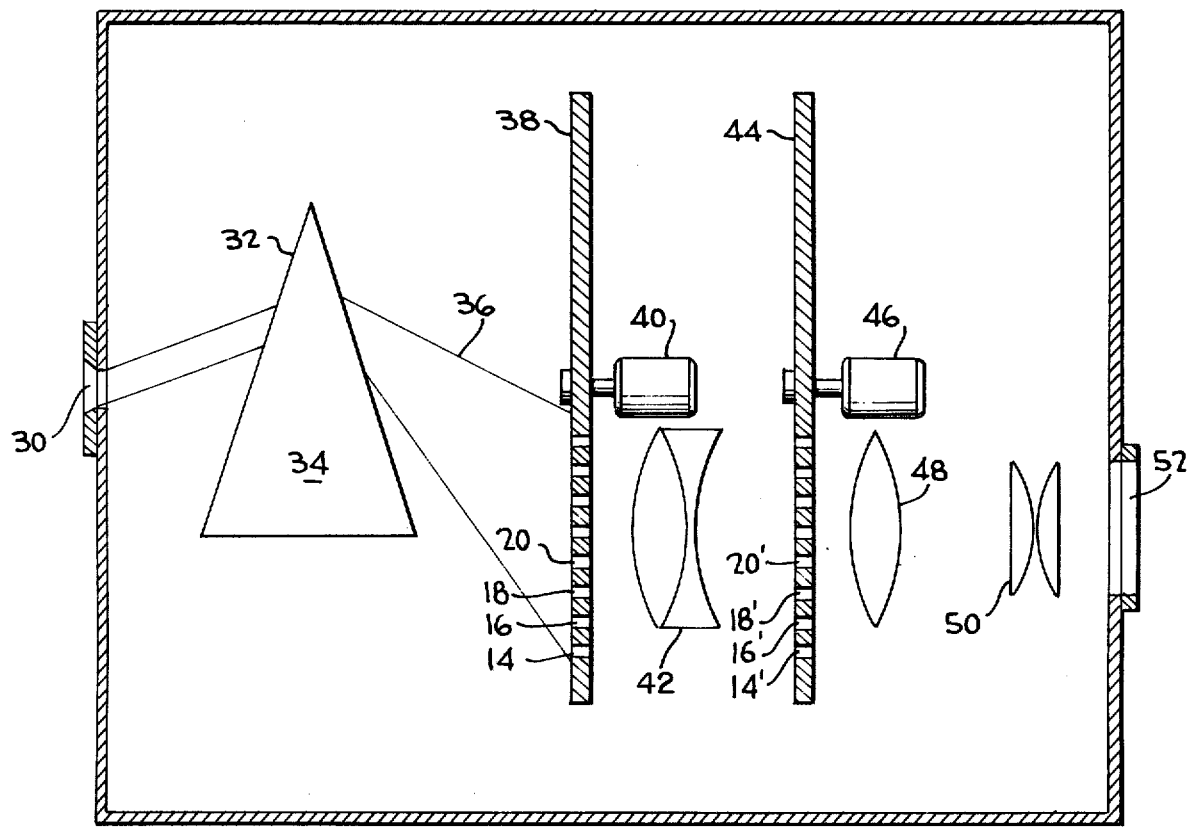
FIG. 4A illustrates the first embodiment of a monochromator in accordance with the present invention.

FIG. 4A illustrates the first embodiment of a monochromator in accordance with the present invention. In this embodiment, white light is focused through entry slit 30 at a desired angle onto a first surface 32 of dispersing prism 34. The light spectra consisting of the colors from the red end of the spectrum to the violet end of the spectrum, for example, are projected onto the radius of first scanning wheel 38. Scanning wheel 38 may comprise any one of the aforementioned scanning discs or wheels illustrated in FIGS. 1–3. Scanning wheel 38 is continuously rotated by a driving source such as servo motor 40. For example, servo motor 40 may comprise a step motor or a synchronous motor. Convergent-divergent lens system 42 projects the scanned or dissected spectra from each of apertures 14, 16, 18, etc. onto the radius of second scanning wheel 44, which scanning wheel may also comprise any one of the scanning discs illustrated in FIGS. 1–3. However, in order to obtain a uniform output, scanning wheels 38 and 44 should be the same type of scanning disc.

Lens system 42 projects the individual spectra from apertures 14, 16, 18, 20, etc. onto respective apertures 14', 16', 18', 20', etc. as illustrated in FIG. 4A. Thus, each of the apertures in scanning wheel 44 transmits a portion of the light spectra, thereby narrowing the spectra at its output. Scanning wheel 44 is driven by servo motor 46 which is driven synchronously with respect to servo motor 40 so that the speed of scanning wheel 44 rotates at a velocity $V_{44} = nV_{38}$ where $V_{44}$ and $V_{38}$ are the respective rotative velocities of scanning wheels 44, 38 and $n$ is an integer $\geq 1$. Apertures 14', 16', 18', 20', etc. of scanning wheel 44 may also be of narrower width than the corresponding apertures of scanning wheel 38 to further narrow the bandwidth of the light spectra. However, this is a less preferred structure because the narrower apertures reduce the light intensity at the output of the monochromator.

With the aforementioned structure, it is apparent that the apertures of scanning wheel 38 will divide the light spectra to respective bandwidths equal in number to the number of apertures on the scanning wheel. The apertures of second scanning wheel 44 will further divide the respective light spectra from the apertures of scanning wheel 38 into yet narrower bandwidths.

Thus, for example, assuming that each scanning wheel had twenty apertures, the light spectra 36 emanating from dispersing prism 34 would be divided into twenty narrow bands of monochromatic light. Assuming the spectral input 36 to consist of a band of light having a bandwidth of 5,000 Angstroms, each spectrum emanating from apertures 14', 16', 18', 20', etc. would have a respective bandwidth of 5,000 Angstroms divided by 400, or approximately 12.5 Angstroms.

The spectral bandwidth from each aperture can be further reduced by interposing another scanning wheel, and using the aforementioned example, each spectral bandwidth output of the third disc would have a bandwidth of 0.625 Angstroms.

The following is a brief discussion of the luminous efficiency of the monochromator illustrated in FIG. 4A. Assuming that the white light is generated from a source such as a high pressure Xenon lamp with an output of 5,000 Watts, the luminous intensity would be approximately 200,000 lumens. Assuming a transmission efficiency of eighty percent for dispersing prism 34, there would be approximately 160,000 lumens on the face of scanning wheel 38. The luminous intensity at the output of scanning wheel 38 would be approximately 8,000 lumens, assuming the above number of apertures in the aforementioned example, and the output from the second scanning wheel would be 1/20 of that or approximately 400 lumens. (neglecting the luminous inefficiency of lens system 42)

It is apparent that the number of apertures on scanning wheel 38, 44 can be varied to obtain a desired spectral bandwidth frequency output and/or a desired luminous flux intensity.

The light spectra from scanning wheel 44 are projected through convergent lens 48 and convergent-divergent lens system 50 so as to be focused across exit port 52. The focused light spectra can then be projected onto or transmitted through a desired specimen or object under investigation and the resulting white patterns or images sensed by a suitable sensing or measuring device. For example, the monochromator of FIG. 4A can be used in place of monochromator described in the aforementioned U.S. patent application.

Figure 4B:
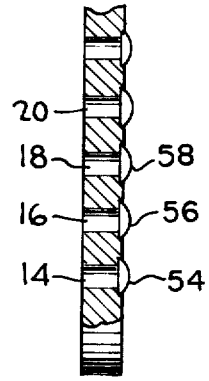
FIG. 4B shows a side view of a disc element in which respective lenses are mounted in aligned relationship with each of the apertures thereof.

FIG. 4B illustrates scanning wheel 38 onto which are mounted lenses 54, 56, 58 which are respectively aligned with apertures 14, 16, 18 (as an example) to disperse the light spectra to the associated apertures in scanning wheel 44. The lens replace the lens system 42.

Figure 6A:
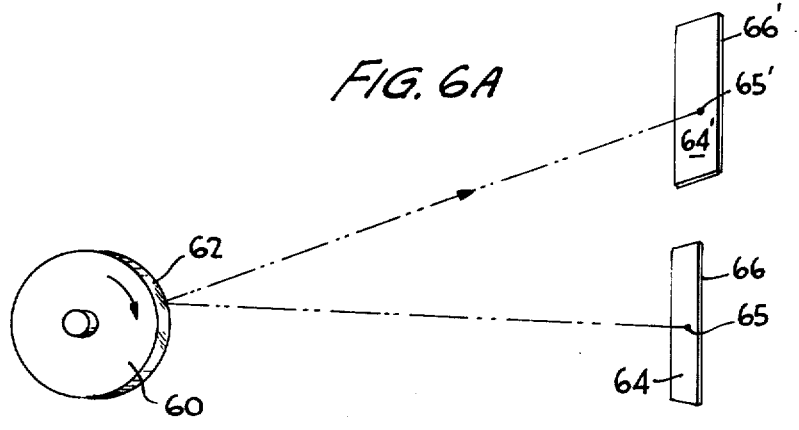

FIG. 7 illustrates a second embodiment of the monochromator apparatus of the present invention. This embodiment uses mirror drum structure for scanning a dispersed light spectrum to obtain from successive mirror drum scanning operations a plurality of distinct, narrow-band spectra, each spectra representing a distinct narrow band-width within said dispersed light spectrum. The theory of operation of the mirror drum scanning devices used in FIG. 9 will be explained with reference to FIGS. 6A, 6B. In FIG. 6A mirror drum 60 includes polished reflective circumferential surface 62 around the entire periphery of cylinder 60. Mirror drum 60 is rotated at a given angular velocity and if a spot of light radiation 65 is present on the surface 64 of screen 66 and mirror drum 60 is positioned with respect to screen 66 so as to reflect light spot 64 from reflective surface 62, the spot of radiation 65 on screen surface 64 will be reflected as a spot of similar light radiation 65' on the surface 64' of screen 66', as illustrated in FIG. 6A.

In FIG. 6B the spot of light radiation on screen surface 64 has been replaced by a dispersed light spectrum 68 and reflective surface 62 of mirror drum 60 has been replaced by a number of individual and distinct mirror surfaces 62a, 62b, 62c, etc. Each of mirror surfaces 62a, 62b, 62c, etc. is set at an angle with respect to the plane of the peripheral edge of cylinder 60 which is defined by the following formula: $A = 360°/N$ wherein $N$ equals the number of mirror surfaces 62a, 62b, 62c, etc. Thus, if light spectrum 68 is reflected onto the angled mirror surfaces 62a, 62b, 62c, etc. each respective mirror surface will reflect a different successive bandwidth spectra of light spectrum 68. Thus, if mirror drum 60 is rotating in the direction indicated in FIG. 6B, the successive mirror surfaces 62a, 62b, 62c, etc. will reflect a unique bandwidth of light spectra from light spectrum 68 beginning at the top of light spectrum 68 and proceeding downwardly to the bottom of the light spectrum. The reflected line spectra may be projected onto surface 64' of screen 66' as a spectrum 68' of narrow bandwidth spectra with gaps between each spectra.

Figure 6C:
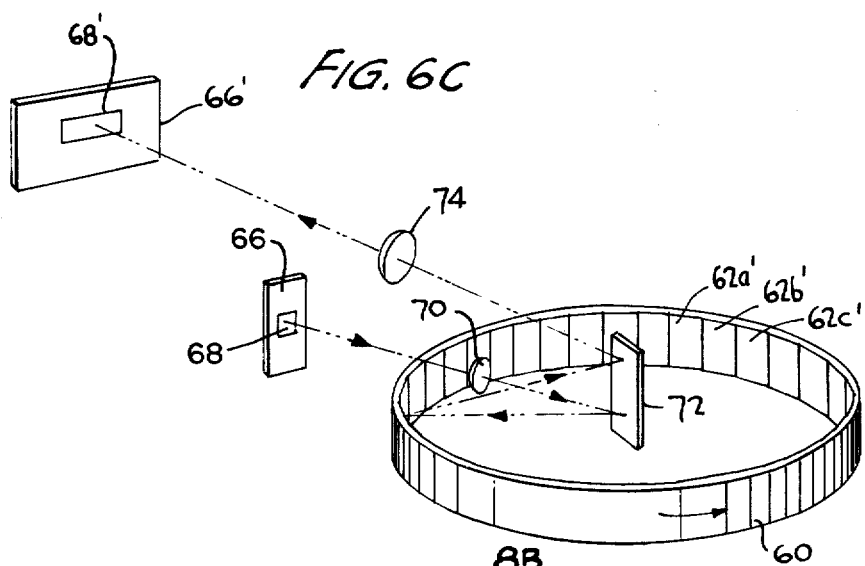

The structure of FIG. 6C represents a modification of that illustrated in FIG. 6B. In FIG. 6C the light spectrum 68 on screen 66 is projected through lens 70 onto the surface of fixed mirror 72. The reflected light from the surface of mirror 72 passes through angled mirror 62a' on mirror drum 60 which is rotated in the direction indicated and is then projected through lens 74 onto screen 66'. Mirrors 62b', 62c', etc. are angled so that narrow-band light spectra of spectrum 68 appear as successive light spectra forming spectrum 68' on screen 66'.

With respect to FIG. 7, broad-band light radiation enters monochromator 80 via entry slit 82. Entry slit 82 comprises a variable entry slit well known to those skilled in the art which has, for example, a 0.1 to 1 millimeter variable opening 84. Light radiation 86 impinges upon pigmented area 88 of transmission grating 92. Pigmented area 88 may, for example, comprise a circular spot 5 millimeters in diameter. Transmission grating 92 is mounted to rotate about axis 92 in the direction indicated in FIG. 7 at a velocity $V_1$ which is equal to 1/90th second or one field of the T.V. system described in the aforementioned U.S. patent application. Each revolution of transmission grating 92 produces a light spectrum extending, for example, from the red to the violet, and that dispersed light spectrum (only one light spectra 94 being shown) is projected onto angled mirror 96. Mirror drum 98 is mounted within monochromator 80 in such a manner to scan light spectra 94 which are reflected from the surface of mirror 96. On the periphery of mirror drum 98 are mounted a number $N_1$ of optical mirror reflecting surfaces 98a, 98b, 98c, etc., similar to the mirror reflecting surfaces described with respect to FIGS. 6B, 6C above. Mirror drum 98 rotates at a velocity $V_1$ which is equal to the velocity of rotation of transmission grating 92.

Thus, once each revolution of transmission grating 92, which produces a complete light spectrum on the surface of mirror 96, mirror drum 98, and more specifically mirror surfaces 98a, 98b, 98c, thereof will successively scan the dispersed light spectrum.

Mirror drum 100 is rotatably mounted within monochromator 80 and includes angled mirror surfaces 100a, 100b, 100c, etc. mounted on its periphery. Mirror drum 100 and its associated mirror reflecting surfaces are mounted so as to receive the respective successive spot reflections from the angled mirror surfaces of mirror drum 98. In a like manner, mirror drum 102 is rotatably mounted within monochromator 80 and includes respective mirror surfaces 102a, 102b, 102c, similar to the previously described mirror surfaces of mirror drums 98, 100. Mirror drum 102 is mounted so that the mirror surfaces thereof respectively receive the reflected light spectra from the mirror surfaces of mirror drum 100. The rotative angular velocities of mirror drums 100, 102 are defined by the following formula:
$V_2 = nV_1$ and $V_3 = mV_2$
wherein $V_2$, $V_3$ respectively define the angular rotative velocities of mirror drum 102 and 100. $n$, $m$ are factors representing the relative velocities of mirror drum 100 with respect to mirror drum 98 and the velocity of mirror drum 102 with respect to the velocity of mirror drum 100. $n, m \geq 1$. The angular velocities of mirror drums determine the frequency of the light spectra output.

The light reflected from each of the mirror surfaces 102a, 102b, 102c, etc. of mirror drum 102 are projected onto angled mirror 104 by means of lens system 106 and the reflected narrow-band light spectra 108 is projected through variable exit slit 110 which is similar to entry slit 82 and is variable from 0.1 to 1 millimeter, for example.

Figure 8A:
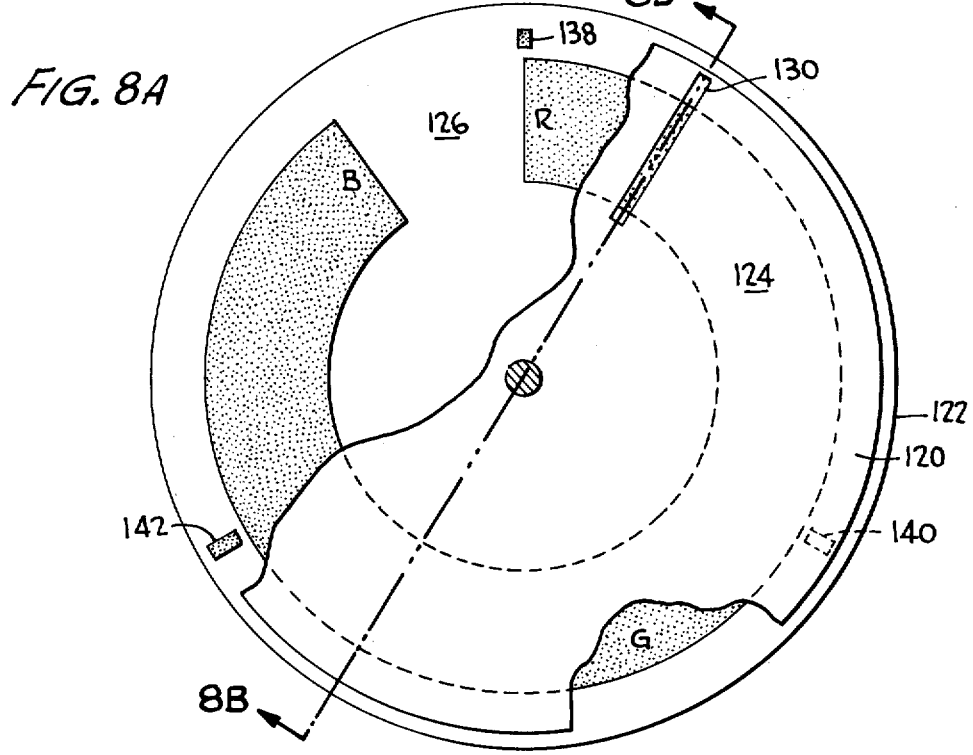
FIG. 8A shows a third embodiment of a monochromator in accordance with the invention.
Figure 8B:
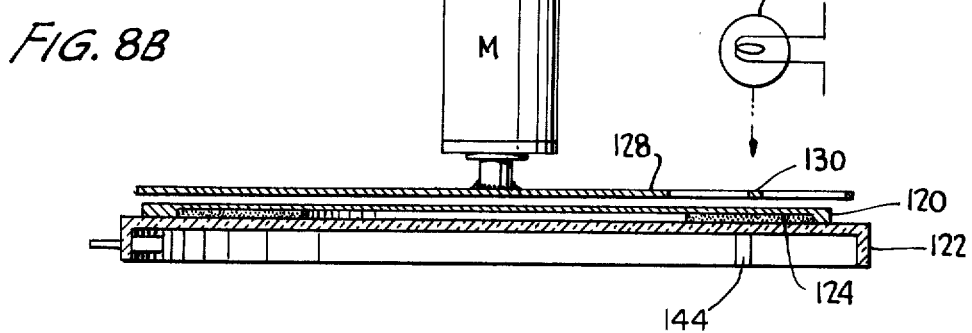
FIG. 8B is a side view of the apparatus of FIG. 8A.

The third embodiment of a monochromator in accordance with the present invention is illustrated in FIGS. 8A, 8B wherein circular glass plates 120, 122 are respectively top and bottom covers for interference filter 124 sandwiched therebetween. Ultra-violet spectra discs 120, 122 may be made of quartz or suprasil, both of which have excellent transmission characteristics in the ultra-violet spectral region. Interference filter 124 is formed as illustrated in FIG. 8A and comprises a reflective metallic coating on glass disc 122 which is of successive thicknesses and is deposited by a vacuum deposition technique which is well known to those skilled in the art of making interference filters. For example, the spectrum bandwidth may be 5,000 Angstroms and there may be one hundred depositions of different thicknesses to provide a continuous spectrum from the red, green and blue light regions. The efficiency of such interference filters is known to be approximately 50%. Gap 126 between the red and blue spectra is approximately 36° which comprises one-tenth of a complete circle for reasons which will be apparent from the following description.

Scanning disc 128 with variable opening slit 130 is mounted with respect to interference filter 124 as illustrated in FIG. 8B. Disc 128 is driven by a suitable motive source $m$ at one revolution per field of the T.V. system disclosed in the aforementioned U.S. patent application. Thus, for example with a ninety field T.V. system, disc 128 would rotate one revolution per 1/90th of a second. When slit 130 passes within or across gap 126, a synchronization light output is provided, which corresponds to the sync pulse generated by monochromator 45 in the aforementioned U.S. application which provides the same function as that synchronization pulse with monochromator of FIGS. 8A, 8B substituted for monochromator 45 in the aforesaid application. Interference filter 124 is exposed to a wide-band, or white, light from light source 136, which may comprise for example a 5,000 Watt pressure Xenon lamp to provide approximately 200,000 lumens of light output onto the surface of interference filter 124.

Opaque sections 138, 140, 142 are respectively located at the beginning of the red, green and blue spectral regions of interference filter 124 and provide signals which can be respectively used to trigger the red, green and blue guns in a three-gun T.V. monitor to thereby synchronize the color T.V. monitor with the spectral output of the monochromator in the color T.V. system described in the aforesaid U.S. patent application. The light spectra output from slit 130 is passed through an aperture 144, which represents the output of the monochromator illustrated in FIG. 8B and that spectra can be used to irradiate a specimen or object as described in the aforesaid U.S. patent application.

In FIG. 8C, a continuous interference filter comprising two 180° interference filters each having a continuous spectrum from the red, green and blue light regions is substituted for the gapped continuous interference filter of FIG. 8A. The interference filter of FIG. 8C may be used for applications involving spectral analysis wherein the red, green and blue light spectra are constantly shifted by an amount equal to the spacing of the gap of the interference filter illustrated in FIG. 8A.

FIG. 5 illustrates the principle of operation of the first and second embodiments of the present invention. A 5,000 Angstrom light spectra band is divided into individual 100 Angstrom band width light spectra by means of a first scanning member. An individual 100 Angstrom band width light spectra is then further subdivided into a 10 Angstrom band width light spectra by a second rotating scanning member. In turn, the individual 10 Angstrom band width light spectra can be further subdivided by a third scanning member. The use of individual scanning members will theoretically, at least, enable further reduction of the band width of the light spectra to produce even narrower band width light spectra output.

What is claimed is:

1. Apparatus for generating narrow band light spectra, comprising:
    a source for generating wide band light spectra;
    first means having a number of apertures and mounted to rotate in a path whereby said apertures intersect said wide band light spectra to produce first narrow band light spectra;
    second means having a number of apertures and mounted to rotate in a path whereby said apertures intersect said first narrow band light spectra to produce second narrow band light spectra;
    the bandwidth of said second narrow band light spectra are narrower than the bandwidth of said first narrow band light spectra; and
    means for rotating said first and second means synchronously.

2. Apparatus as in claim 1 wherein said first and second means each comprise a disc-like member mounted co-axially with respect to one another.

3. Apparatus as in claim 1 further comprising an output aperture for passing said second narrow band spectra and first projection means for projecting said first narrow band light spectra to said second means and second projection means for projecting said second narrow band light spectra to said output aperture.

4. Apparatus as in claim 3 wherein said first and second means for projecting each include a lens for projecting the individual narrow band light spectra from each aperture in each of said first and second means, respectively.

5. Apparatus as in claim 1 wherein the synchronous relationship of the respective rotational velocities of said first and second means is defined by:
$$V_1 = nV_2$$
where
    $V_1$ is the rotational velocity of said second means,
    $V_2$ is the rotational velocity of said first means, and
    $n$ is an integer $\geq 1$.

6. Apparatus as in claim 1 further comprising additional means having a number of apertures and mounted to rotate in a path whereby said apertures intersect said second narrow band light spectra to produce third narrow band light spectra and said third narrow band light spectra are narrower than said second narrow band light spectra.

7. Apparatus as in claim 1 wherein the apertures in said first and second means are located on a single-turn clockwise spiral trace of each respective first and second means.

8. Apparatus as in claim 7 wherein the apertures in each of said first and second means are in non-spaced relationship.

9. Apparatus as in claim 7 wherein the apertures in each of said first and second means are in spaced relationship to one another.

10. Apparatus as in claim 2 wherein the apertures in said first and second means are located on at least one radius of each respective first and second disc-like members.

11. Apparatus as in claim 10 wherein the apertures in each of said first and second means are in non-spaced relationship.

12. Apparatus as in claim 10 wherein the apertures in each of said first and second means are in spaced relationship to one another.

13. Apparatus for generating narrow band light spectra, comprising:
    a transmission grating rotating at a given velocity for generating wide band light spectra from a source of light radiation;
    a first drum-like member rotating at the same velocity as said transmission grating and including a number of reflecting mirror surfaces mounted on the circumference thereof;
    a second rotating drum-like member including a number of reflecting mirror surfaces mounted on the circumference thereof;
    said first drum-like member is mounted to reflect narrow band light spectra generated by reflection of portions of said wide band light spectra from said number of reflecting mirror surfaces onto the reflecting mirror surfaces of said second drum-like member, whereby the band-width of the narrow band light spectra reflected from the reflecting mirror surfaces of said second drum-like member are narrower than the bandwidth of the narrow band light spectra reflected from said reflecting mirror surfaces of said first drum-like member; and
    means for rotating said first and second drum-like members synchronously.

14. Apparatus as in claim 13 further comprising at least one additional rotating drum-like member having a number of reflecting surfaces on the circumference thereof and mounted to reflect the narrow band light spectra from said second drum-like member for producing a narrow band light spectra output having narrower bandwidth light band spectra than the bandwidth of the narrow band light spectra reflected from said second drum-like member, and means for rotating said at least one additional rotating drum-like member in synchronism with said first and second drum-like members.

15. Apparatus as in claim 13 further comprising means for reflecting the wide band light spectra from said transmission grating to the reflecting surfaces of said first drum-like member.

16. Apparatus as in claim 14 wherein the synchronous rotational relationship of the respective first, second, and at least one additional drum-like member is defined by:

$$V_1 = nV_2$$
$$V_2 = mV_3$$

where $V_3$, $V_2$ and $V_1$ are the respective rotational velocities of the first, second and additional drum-like member, and $n$ and $m$ are integers $\geq 1$.

* * * * *